US006533285B2

(12) United States Patent
Nava et al.

(10) Patent No.: US 6,533,285 B2

(45) Date of Patent: Mar. 18, 2003

(54) ABRADABLE COATING AND METHOD OF PRODUCTION

(75) Inventors: Yrene L. Nava, Chula Vista, CA (US); Zaher Z. Mutasim, San Diego, CA (US)

(73) Assignee: Caterpillar Inc, Peoria, IL (US)

(*) Notice: Subject to any disclaimer, the term of this patent is extended or adjusted under 35 U.S.C. 154(b) by 48 days.

(21) Appl. No.: 09/777,026

(22) Filed: Feb. 5, 2001

(65) Prior Publication Data

US 2002/0145258 A1 Oct. 10, 2002

(51) Int. Cl.[7] .................... F16J 15/447

(52) U.S. Cl. .................... 277/415; 277/411; 277/412

(58) Field of Search .................... 277/412, 415, 277/411, 414

(56) References Cited

U.S. PATENT DOCUMENTS

| | | | | |
|---|---|---|---|---|
| 3,879,831 | A | | 4/1975 | Rigney et al. |
| 4,039,296 | A | | 8/1977 | Levinstein |
| 4,249,913 | A | | 2/1981 | Johnson et al. |
| 4,273,824 | A | | 6/1981 | McComas et al. |
| 4,506,503 | A | * | 3/1985 | Ogborne et al. |
| 4,664,973 | A | | 5/1987 | Otfinoski et al. |
| 4,696,855 | A | | 9/1987 | Pettit, Jr. et al. |
| 4,867,639 | A | | 9/1989 | Strangman |
| 4,936,745 | A | | 6/1990 | Vine et al. |
| 5,024,884 | A | | 6/1991 | Otfinoski |
| 5,122,182 | A | | 6/1992 | Dorfman et al. |
| 5,204,191 | A | | 4/1993 | Dubois et al. |
| 5,432,011 | A | | 7/1995 | DuBois et al. |
| 5,434,210 | A | * | 7/1995 | Rangaswamy et al. |
| 5,472,315 | A | | 12/1995 | Alexander et al. |
| 5,474,421 | A | * | 12/1995 | Rossman |
| 5,536,022 | A | | 7/1996 | Sileo et al. |
| 5,571,344 | A | | 11/1996 | Dubois et al. |
| 5,593,278 | A | * | 1/1997 | Jourdain et al. |
| 5,649,282 | A | | 7/1997 | Dubois et al. |
| 5,652,877 | A | | 7/1997 | Dubois et al. |
| 5,888,661 | A | | 3/1999 | Dubois et al. |
| 6,039,535 | A | | 3/2000 | Kobayashi et al. |
| 6,062,813 | A | * | 5/2000 | Halliwell et al. |
| 6,074,497 | A | | 6/2000 | Inoue et al. |
| 6,254,700 | B1 | * | 7/2001 | Hermanek |

FOREIGN PATENT DOCUMENTS

| | | | |
|---|---|---|---|
| EP | 0 983 813 A2 | | 8/1999 |
| GB | 2 112 878 A | * | 12/1982 |
| GB | 2 225 388 | | 5/1990 |

* cited by examiner

*Primary Examiner*—Lloyd A. Gall
*Assistant Examiner*—Enoch E. Peavey
(74) *Attorney, Agent, or Firm*—Keith P Roberson

(57) ABSTRACT

An improved sealing mechanism for a turbomachine such as a compressor for a gas turbine engine employs an abradable coating with a solid lubricant and metal alloy having a quasicrystalline phase.

19 Claims, 2 Drawing Sheets

ABRADABLE COATING AND METHOD OF PRODUCTION

TECHNICAL FIELD

The present invention relates to an abradable coating and more particularly to applying such abradable coating in a turbomachine.

BACKGROUND ART

In turbomachines, such as centrifugal compressors, axial compressors, and turbines, rotating blades attach or are integral with a rotor assembly. A shroud surrounding the rotating blades acts in conjunction with the rotating blades to keep a pressurized fluid flowing in a particular direction. Pressurized fluid tends towards migrating to areas of lower pressure. In many instances, pressurized fluid will pass to a lower pressure region by escaping between the blades and the shroud.

To reduce migration of pressurized fluid and therefore improve efficiency of the turbomachine, clearances between the blades and housing must be reduced to a minimum. In U.S. Pat. No. 6,039,535 issued to Kobayashi et al Mar. 21, 2000, a seal is placed on the shroud of a centrifugal compressor. The seal includes a portion covered with an abradable material. A fin extends from the rotor to close proximity with the abradable material. The fins are designed to create a groove in the abradable coating as the turbomachinery reaches some operating condition. By creating the groove, the fin and seal form very close tolerances. However, the abradable material eventually wears away from the rotor through peeling.

Similarly, in an axial flow rotating machine the fins of the seal are placed on tips of the blades. An abradable seal is attached to the shroud. In U.S. Pat. No. 4,867,639 issued on Sep. 19, 1989 to Strangman, the abradable seal is a soft ceramic material in a honeycomb substrate. However, ceramics may be costly and complex. While the cost and complexity may be needed at temperature upwards of 2300 F, lower cost and lower complexity abradable seals with good wear resistance are needed for lower temperature applications.

The present invention is directed at overcoming one or more of the problems as set forth above.

DISCLOSURE OF THE INVENTION

In one aspect of the present invention a turbomachine has improved efficiency. The turbomachine has a rotor with a plurality of blades. A shroud is spaced radially outward from the rotor. A sealing portion is between the shroud and the rotor. an abradable coating covers at least a portion of the sealing portion. The abradable coating includes a solid lubricant and a metal alloy having a quasicrystalline phase.

In another embodiment of the present invention an abradable coating comprise by weight about: 2–16 percent copper; 5–20 percent solid lubricant; 3–7 percent silicon; 1–9 percent chromium; 1–12 percent iron; 3–7 percent polyester; and balance composed of aluminum and traces of other elements wherein at least a portion of aluminum being in a quasicrystalline phase.

BEST MODE FOR CARRYING OUT THE INVENTION

Figure 1:
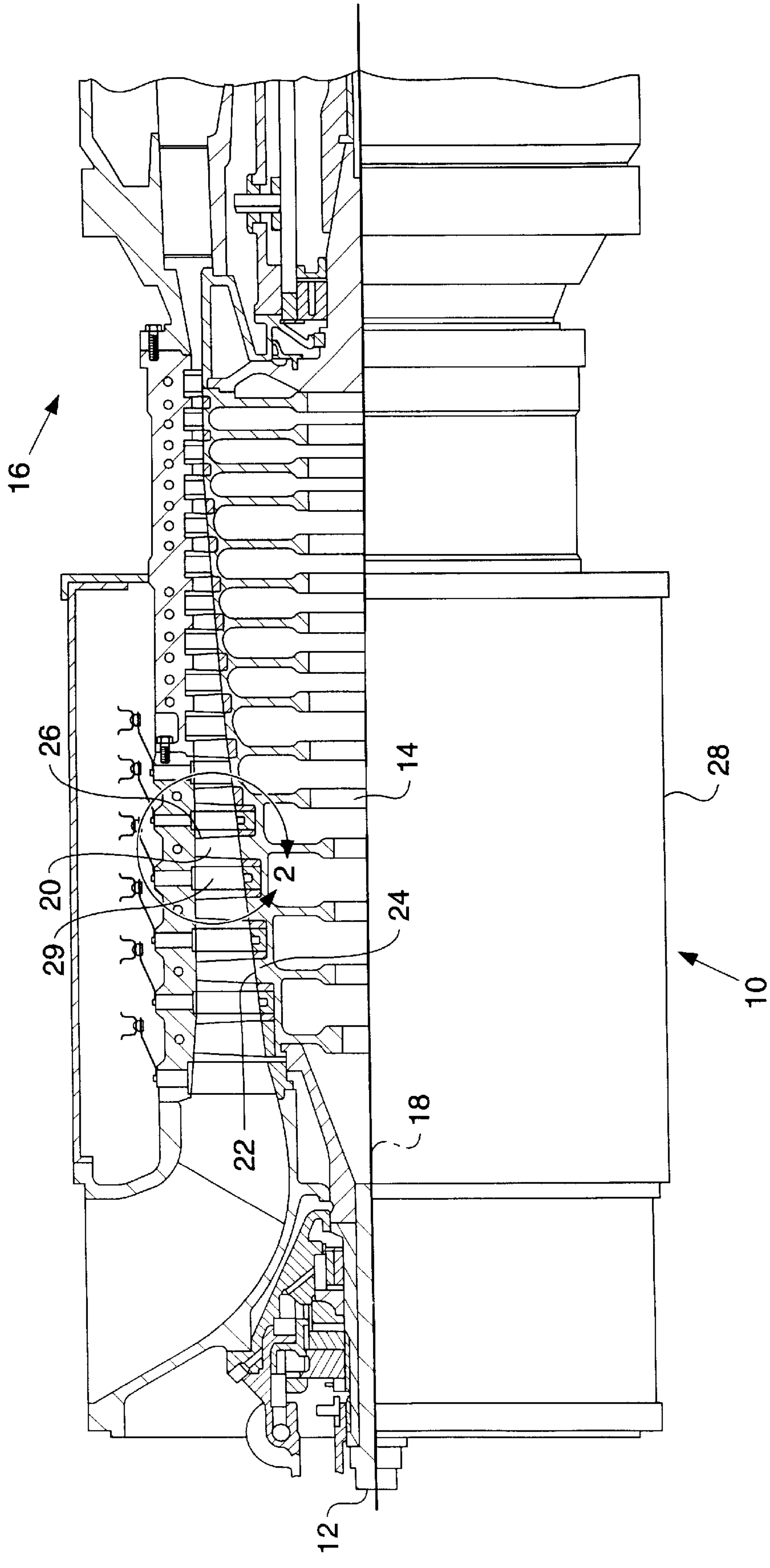
FIG. 1 constitutes a partially sectioned side view of a compressor for a gas turbine engine embodying the present invention.

In this application, a turbomachine 10 shown in FIG. 1 includes a shaft 12 attached to a rotor or disk 14. By way of example, the turbomachine is shown as an axial compressor 10 section of a gas turbine engine (not shown). The shaft 12 and rotor 14 are generally coaxial about a central axis 18. The rotor 14 has a plurality of blades 20 extending radially from a periphery of the disk. The blades 20 may also be integral with the rotor 14. The blades 20 have a root portion 24 adjacent the periphery 22 and a tip portion 26.

A shroud or housing 28 generally cylindrical in shape is placed adjacent to the tip portion 26 and concentric about the central axis 18. The shroud has a plurality stators or vanes 29 extending inwardly from the shroud 28.

Figure 2:
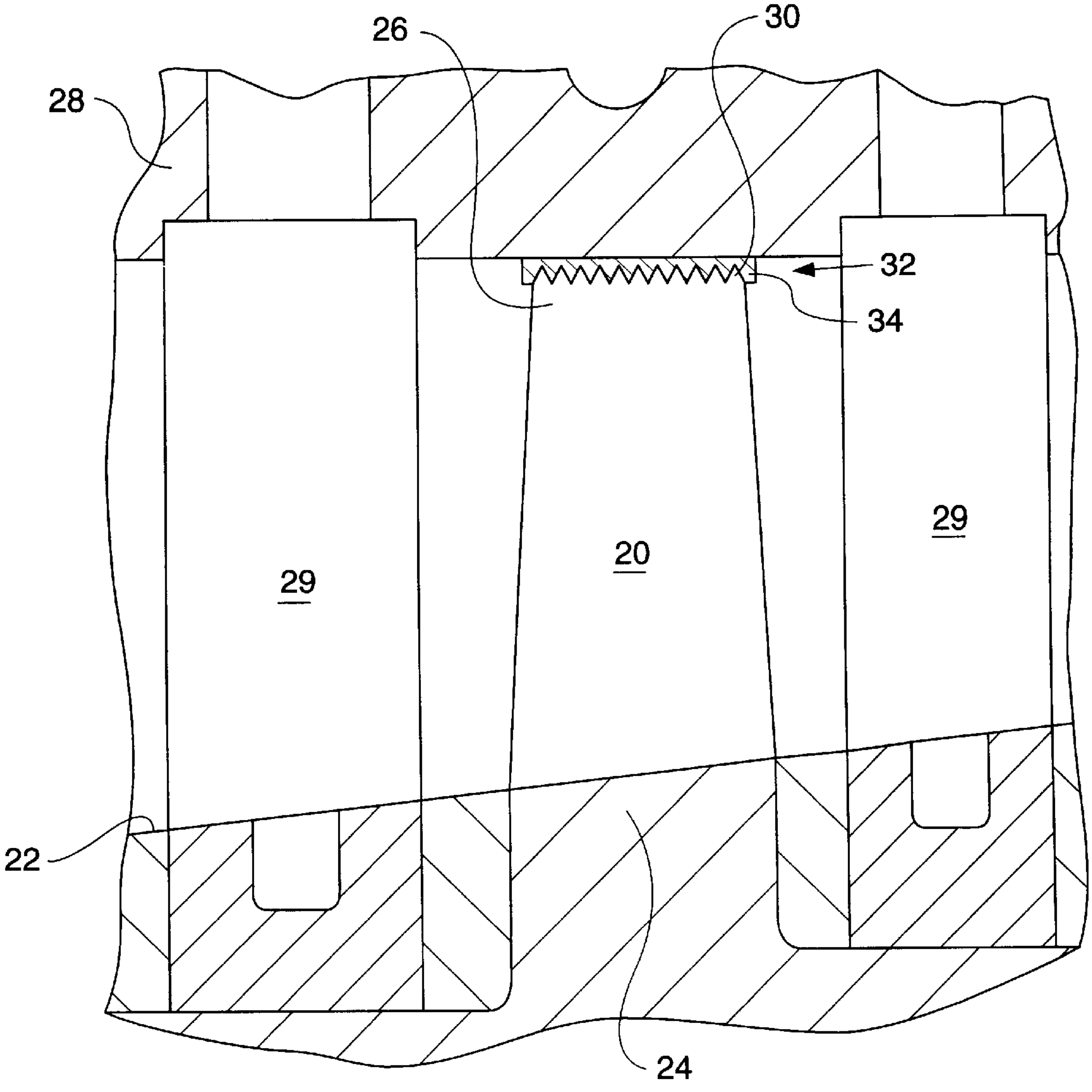
FIG. 2 is an expanded view of a sealing portion of the compressor between a housing and blade.

As shown in FIG. 2, a sealing region 32 is formed between the tip portion 26 and the shroud 28. Conventionally, a plurality of fins 30 extend outward from the tip portion 26 toward the shroud 28. The sealing region 32 includes an abradable coating 34. Alternatively, the fins 30 may be placed on the shroud 28 extending inwardly with the tip portion 26 having the abradable coating 34 applied by some conventional manner such as air plasma spray or flame spray applies the abradable coating 34 to a thickness of between 0.020 to 0.080 inches (0.5–2.0 mm). The abradable coating 34 is oxidation resistant up to a temperature of around 900 F (482 C) and machineable to a relatively smooth finish of about 64 to 100 Ra($\mu$in). While an axial compressor is shown, any turbomachinery having rotating blades 20 and a shroud 28 may benefit from the present invention such as a turbine or centrifugal compressor.

The abradable coating 34 for this application contains a solid lubricant and a metal alloy having a quasi-crystalline phase. The solid or dry lubricant may be selected from graphite, hexagonal boron nitride, calcined bentonite, or some combination of one or more of those listed. The metal alloy in this application is aluminum based. However, other oxidation resistant alloys having quasicrystalline structures may be used. In the preferred, embodiment the abradable coating 34 has about 2–16% by weight copper, 5–20% by weight hexagonal boron nitride, 3–7% by weight silicon, 1–9% by weight chromium, 1–12% by weight iron, 3–7% by weight polyester with a remainder composed of aluminum and traces of other elements prior to application to the sealing portion 32. Table 1 shows comparisons from rub-rig tests of various embodiments of the abradable coating 34 with existing commercial coatings.

TABLE 1

| Property | Coating 1 | Coating 2 | Commercial 1 | Commercial 2 |
|---|---|---|---|---|
| Composition | Al-15Cu-13Cr-11Fe- | Al-12BN-7Cu-6Cr-5Fe- | Al-8Si-20BN-8PE | Al-15Cr-17Cu-13Fe |

TABLE 1-continued

| Property | Coating 1 | Coating 2 | Commercial 1 | Commercial 2 |
|---|---|---|---|---|
| | BN-1Si-1PE | 5Si-5PE | | |
| Hardness R15Y | 93 ± 2 | 85 ± 5 | 62 ± 3 | 94 ± 4 |
| % Change in Blade-Weight at 65° F. | 0.022 | 0.0032 | 0.0695 | 0.0063 |
| Temperature Spike at 65° F. (° F.) | 180 | 60 | 340 | 5 |
| % Change in Blade-Weight at 900° F. | 0.0413 | 0.0063 | 0.0063 | Failed |
| Temperature Spike at 900° F. (° F.) | 400 | 170 | 60 | Failed |
| Estimated Weight change after 15,000 h exposure at 900° F., 1,000 h (mg/cm$^2$) | 9.04 Exponential rate | 6.72 Exponential rate | 13.61 Linear rate | 11.89 Exponential rate |

As shown in Table 1, magnitude of temperature spike is indicative of abradability and coefficient of friction as the fin 30 rubs against the shroud 28. While such rubs are unlikely at ambient temperatures of 65 F, the compressor 10 should be able to withstand these conditions. Commercial coating 2 exhibits a low temperature spike at 65 F, but commercial coating 2 is brittle due to its quasicrystalline structure and tends to fail during testing especially at the elevated temperature of 900 F. Commercial coating 1 provided a high temperature spike at 65 F. Coatings 1 and 2 exhibited moderate temperature spikes over the entire range 65 F through 900 F.

Another manner of testing abradability characteristics involves measuring change in weight of blades and shrouds. As shown in Table 1, coatings 1 and 2 exhibit negligible weight changes at the elevated temperature 900 F. Commercial coating 2 exhibits significant wear and failure throughout the temperatures from 65 F to 900 F. Commercial coating 1 provides similar results to those of the coatings 1 and 2. However, coatings 1 and 2 provide better oxidation resistance and overall performance over the entire temperature range from 65 F to 900 F. Further testing would show that the total by weight percentage of hexagonal boron nitride may vary between about 5% to 20% by weight of the abradable coating. However, ranges from about 12% and greater provide increased abradability over a wider temperature range.

Industrial Applicability

Reducing leakage between the blades 20 and shroud 28 greatly improve efficiency of turbomachinery 10. The rotating fins 30 wear a groove into the abradable coating 34 further reducing clearance between the blades 20 and the shroud 28. Reduced clearances inhibit pressurized fluid from escaping to lower pressure regions. Combining properties of the solid lubricant and aluminum based alloy having a quasi-crystalline structure promotes beneficial abrasive properties from about 65 F through 900 F in the event blade rubs were to occur prior to reaching operating conditions. Solid lubricants reduce coefficients of friction and thus reduce heat generation. Quasicrystalline materials reduce coefficient of friction and improve abradability. However, quasicrystalline materials tend to undergo structural changes as temperatures increase. Reducing heat generation using solid lubricants allows extension of operating conditions for the quasicrystalline material.

What is claimed is:

1. A turbomachine having improved efficiency, said turbomachine comprising:
   - a rotor having a plurality of blades;
   - a shroud spaced radially outward from said rotor;
   - a sealing portion being disposed between said shroud and said rotor;
   - an abradable coating covering at least a portion of said sealing portion, said abradable coating comprising a solid lubricant and a metal alloy having a quasicrystalline phase and silicon.

2. The turbomachine as defined in claim 1 wherein said metal alloy contains aluminum.

3. The abradable coating as defined in claim 1 wherein said silicon is about 3 to 7 percent by weight of said abradable coating.

4. The turbomachine as defined in claim 1 wherein said solid lubricant is hexagonal boron nitride.

5. The turbomachine as defined in claim 4 wherein said boron nitride is between about 5 to 20 percent by weight of the abradable coating.

6. The turbomachine as defined in claim 1 wherein said abradable coating generally comprises by weight about 2–16 percent copper, 5–20 percent solid lubricant, 3–7 percent silicon, 1–9 percent chromium, 1–12 percent iron, 3–7 percent polyester with a remainder composed of aluminum and traces of other elements.

7. The turbomachine as defined in claim 1 wherein said turbomachine is an axial compressor.

8. The turbomachine as defined in claim 1 wherein said abradable coating is connected with said shroud.

9. The turbomachine as defined in claim 1 wherein said abradable coating is between about 0.020 to 0.080 inches (0.5–2.0 mm).

10. A turbomachine having improved sealing between a shroud and a rotor, said turbomachine comprising:
    - a rotor;
    - a plurality of blades connected with said rotor about a periphery of said rotor, said blades having a tip portion distal from said periphery;
    - a plurality of fins connected with said tip portion;
    - a shroud being adjacent said plurality of fins;
    - an abradable coating covering said shroud proximate said fins, said abradable coating comprising a metal alloy having a quasicrystalline structure, silicon and a solid lubricant.

11. The turbomachine as defined in claim 10 wherein said solid lubricant is hexagonal boron nitride.

12. The turbomachine as defined in claim 11 wherein said hexagonal boron nitride is about 12 percent or greater by weight of said abradable coating.

13. An abradable coating for placement on a turbomachine, said abradable coating comprising by weight about:

2–16 percent copper;

5–20 percent solid lubricant;

3–7 percent silicon;

1–9 percent chromium;

1–12 percent iron;

3–7 percent polyester;

balance composed of aluminum and traces of other elements wherein at least a portion of aluminum being in a quasicrystalline phase.

14. The abradable coating described in claim 13 wherein said solid lubricant is hexagonal boron nitride.

15. A gas compressor component for a gas turbine engine, said gas compressor component comprising:

a shroud for the gas compressor; and an abradable coating covering at least a portion of said shroud, said abradable coating comprising an aluminum alloy, a solid lubricant, and silicon wherein said aluminum alloy is at least partially a quasicrystalline phase.

16. The gas compressor component as defined in claim 15 wherein said solid lubricant is hexagonal boron nitride.

17. The gas compressor component as defined in claim 16 wherein said abradable coating is 5–20% hexagonal boron nitride by weight.

18. The gas compressor component as defined in claim 17 wherein said abradable coating is 3–7% silicon by weight.

19. The gas compressor component as defined in claim 15 including 3–7% polyester by weight.

* * * * *

UNITED STATES PATENT AND TRADEMARK OFFICE

CERTIFICATE OF CORRECTION

PATENT NO. : 6,533,285 B2

DATED : March 18, 2003

INVENTOR(S) : Yrene L. Nava et al.

It is certified that error appears in the above-identified patent and that said Letters Patent is hereby corrected as shown below:

Title page,
Item [73], Assignee, should read as follows:
-- [73] Assignee: Solar Turbines Incorporated, San Diego, California (USA) --.

Signed and Sealed this

Seventeenth Day of June, 2003

JAMES E. ROGAN
*Director of the United States Patent and Trademark Office*